United States Patent [19]

Blechinger

[11] 4,434,656

[45] Mar. 6, 1984

[54] MASS AIR FLOW SENSOR

[75] Inventor: Chester J. Blechinger, Bloomfield Hills, Mich.

[73] Assignee: Ford Motor Company, Dearborn, Mich.

[21] Appl. No.: 380,841

[22] PCT Filed: Apr. 8, 1982

[86] PCT No.: PCT/US82/00434

§ 371 Date: Apr. 8, 1982

§ 102(e) Date: Apr. 8, 1982

[87] PCT Pub. No.: WO83/03669

PCT Pub. Date: Oct. 27, 1983

[51] Int. Cl.$^3$ .............................................. G01F 1/68
[52] U.S. Cl. .................................................... 73/204
[58] Field of Search ............................. 73/204, 861.22

[56] References Cited

U.S. PATENT DOCUMENTS

| 2,981,104 | 4/1961 | Auger | 73/204 X |
|---|---|---|---|
| 3,352,154 | 11/1967 | Djorup | 73/204 X |
| 3,359,794 | 12/1967 | Rosenberg | . |
| 3,693,438 | 9/1972 | Yamasani et al. | 73/861.22 |
| 3,777,563 | 12/1973 | Yamasaki et al. | 73/861.22 |
| 4,206,638 | 6/1980 | Djorup | 73/204 X |
| 4,215,565 | 8/1980 | Zanker | 73/204 X |
| 4,279,147 | 7/1981 | Djorup | 73/204 X |

FOREIGN PATENT DOCUMENTS 2025062 1/1980 United Kingdom ................. 73/204

Primary Examiner—Herbert Goldstein
Attorney, Agent, or Firm—Peter Abolins; Robert D. Sanborn

[57] ABSTRACT

A heated element mass air flow meter 10 includes a cylinder 20 having a surface 21 with an area of stagnation 22. Element 11 is positioned aft of area of stagnation 22 and forward of a downstream area of turbulence 23. Deposition of air born dirt takes places at the stagnation area because dirt particles have a greater density and inertia than air and cannot turn as easily. The air passing the element has been substantially separated from air born dirt and carries less dirt than the remainder of the air stream. The accuracy of heated element meters is reduced by deposition of dirt on the element. A configuration as described reduces the amount of dirt striking the heated element 11 and improves accuracy of the meter.

3 Claims, 5 Drawing Figures

MASS AIR FLOW SENSOR

TECHNICAL FIELD

This invention relates to heat transfer type of mass air flow metering apparatus of the type where an elongated body is placed in the air flow stream.

BACKGROUND ART

Various hot wire mass air flow meters are known. In general, they include a resistance wire stretched across the air flow so that the wire is cooled by the air flow. The cooling of the wire changes the electrical characteristics of the wire in a manner proportional to the mass of air flow past the wire. For example, if the wire has a temperature sensitive resistance and can be heated to a given temperature using a known amount of current, any additional amount of current needed to maintain the temperature can be attributed to the cooling effects of the air flowing past it. Alternatively, the change in resistance of the wire can be measured while maintaining a constant current flow. Typically, a separate measurement of air temperature is made so that any change in the electrical characteristics of the wire can be correlated with the mass of air flowing past the wire.

While the accuracy of such systems in relatively clean air has been acceptable, dirt particles in the air have posed problems. Dirt particles can cause abrasion and errosion of the wire element eventually destroying it. Dirt particles can also change the electrical characteristics of the wire. For example, a layer of dirt on the wire can insulate it from the cooling effects of the air thereby destroying accuracy. Various solutions to this problem have been tried. For example, applying an usually high current to heat the wire can be used to burn off the dirt. However, this adds to the complexity of the system and is only a periodic, not a continuous, solution. Further, the wire must be built to be able to withstand this additional current. In fact, sometimes relatively high voltages required in this system have caused the wire to burn up.

U.S. Pat. No. 4,215,565 issued to K. J. Zanker recognizes that dirt may adversely affect the measurement of a fluid carrying the dirt. Inserted into a fluid carrying conduit is a probe having an inlet opening which faces downstream in the conduit. The inlet opening communicates with an outlet opening in the end surface of the probe. The main flow, in passing through the conduit, causes a sampling flow of the fluid to be withdrawn from the conduit, and to be passed through the probe from the inlet opening to the outlet opening, and so back to the conduit. As a result, the amount of dirt which will be carried in the sampling flow is reduced from that in the main stream.

U.S. Pat. No. 3,352,154 issued to R. S. Djorup teaches a fluid flow sensor constructed of a refractory body having a surface to which adhere an electrically conductive ring and a pair of electrically conductive strips. The strips and the ring are made of a material exhibiting a change in electrical resistivity as a function of temperature. The problem of reducing the amount of dirt hitting the sensor is not solved. However, it is recognized that the sensor must withstand abrasion by dust in the atmosphere and erosion by weather. Accordingly, the heated metal elements are of sufficient thickness to remain intact over a lengthy period despite abrasion and erosion. Such an approach does not solve the problem of deposition of dirt on an electrically conductive surface which will affect the accuracy of the device.

There still remains the problem of reducing dirt deposition on a heated wire positioned across the air stream flow in a hot wire mass air flow meter. None of the uncovered prior art provides a solution to this problem. Such drawbacks have limited the use of the hot wire meter outside of the laboratory. However, it would be advantageous to develop a hot wire meter which could be sufficiently accurate in a relatively dirty environment so that it could be used as part of an engine control apparatus for an automobile.

DISCLOSURE OF THE INVENTION

In accordance with the embodiment of this invention, a heat transfer mass air flow meter for measuring mass air flow includes an elongated element positioned in an air flow adjacent an elongated bluff body means. The element has a temperature responsive electrical resistivity so that the mass of air flow past the elongated element can be electrically determined. The elongated bluff body means is positioned generally parallel to and spaced from the wire means. The bluff body provides sufficient resistance so as to create an area of stagnation upstream of the bluff body. The element means is positioned outside of the area of stagnation so as to be in a relatively dirt free area in comparison to the remainder of air stream. Prevention of dirt deposition eliminates air flow meter drift thereby maintaining the air flow meter at its original calibration. In addition to preserving accuracy of the air meter, abrasive wear on the element is reduced and useful meter life extended.

BRIEF DESCRIPTION OF THE DRAWINGS

FIG. 1a is a plan view of a heated element location adjacent a cylinder for preventing deposition of dirt on the heated element including the fluid flow patterns around the cylinder;

FIG. 1b is a graph of the pressure versus position around the cylinder of FIG. 1a;

BEST MODE FOR CARRYING OUT THE INVENTION

Figure 1:
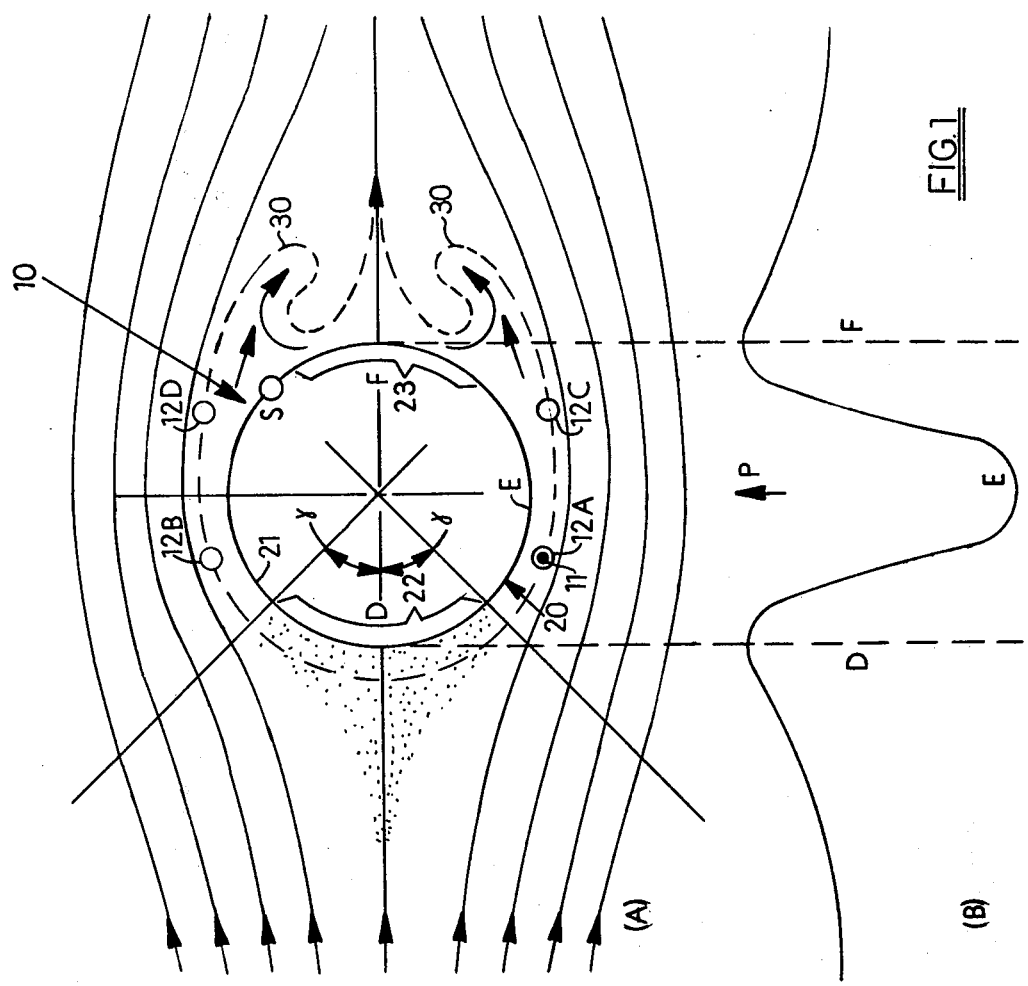

Referring to FIG. 1a, a heated element mass air flow meter 10 includes a cylinder 20 having a cylinder surface 21 with an area of stagnation 22. Heated element 11 is positioned aft of the area of stagnation 22 and forward of a downstream area of turbulence 23 indicated by air flow lines 30 which rapidly change direction in a swirl. This invention recognizes that dirt will be deposited along area of stagnation 22 on the leading surface of cylinder 20. Beyond this area, the air will be clean, and there will be no more dirt deposition on the surface of cylinder 20. Therefore, a heated element 11 is placed adjacent to a clean region of cylinder surface 21. However, heated element 11 is not placed in the vicinity of the trailing surface of cylinder 20 since this would result in a noisy output from heated element 11 caused by turbulence downstream.

Area of stagnation 22 is defined by an angle delta on either side of a center line 24 extending through cylinder 20 in a direction parallel to the air flow. Four possible element locations 12A, 12B, 12C and 12D are indicated. Locations 12A (including element 11) and 12B are on the upstream half of cylinder 20 but just aft of area of stagnation 22. Locations 12C and 12D are on the downstream half of cylinder 20 but just upstream of area of turbulence 23. As indicated in FIG. 1a, locations 12A, 12B, 12C and 12D are adjacent a cylinder 20 at a distance substantially less than the longest cross section dimension of cylinder 20. Further, cylinder 20 has a relatively large cross section area in comparison to the cross section of heated element 11. The relative sizes of element 11 and cylinder 20 are also apparent in FIG. 2.

Referring to FIG. 1b, a graph shows the variation of pressure magnitude with respect to position along an air stream flowing toward and around cylinder 20. As the air stream approaches area of stagnation 22, the pressure increases to a maximum at point D, the most upstream point of cylinder 20. Pressure then drops as the air flows around the cylinder to an outermost point E. Downstream flow past point E towards the most downstream point F on cylinder 20 results in increasing pressure peaking at point F. The increase in pressure at point D is due to a deflection of the air by cylinder 20. The increase in pressure at point F is due to turbulence in the air on the downstream side of cylinder 20. Turbulence begins at a point of separation S, about 45° upstream around the cylinder from point F. That is, at point S the air stream no longer follows the contour of cylinder 20. The remaining kinetic energy in the air stream is insufficient to carry it against the positive pressure gradient from point E to point F. It cannot, therefore, proceed far in this region of increasing pressure. It comes to rest and because of the pressure distribution of the external flow, is set into motion backward. This backflow is the beginning of separation.

Figure 2:
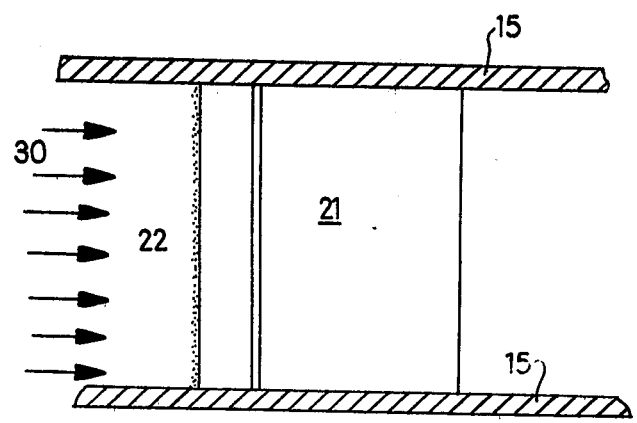
FIG. 2 is a side view of the heated element positioned adjacent a cylinder.

Referring to FIG. 2, this is a side view of the apparatus of FIG. 1a including cylinder 20 and element 11. Such positioning will maintain element 11 free from dirt deposition. Further, element 11 will be protected from air flow pulsations sources downstream of the sensor that occur during certain engine operating conditions such as backfire. Such pulsations travel in a direction opposite to the normal air flow and can be continuous or intermittent. Cylinder 20 and element 11 are supported between walls 15 of a conduit for air flow.

Figure 3:
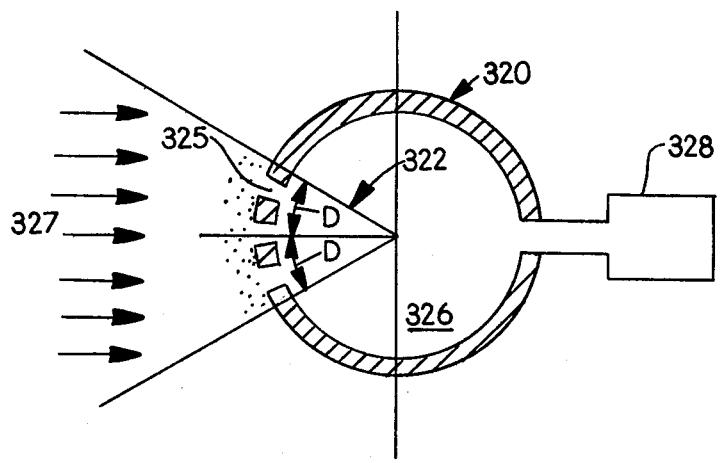
FIG. 3 is a cross section similar to FIG. 1 including slots in the dirt stagnation area for passing dirt into the interior of the cylinder.

Referring to FIG. 3, this is similar to FIG. 1 but includes slots 325 positioned within an area of stagnation 322. A cylinder 320 includes an interior cavity 326 which is coupled through slots 325 to the air flow indicated by arrows 327. Slots 325 prevent an excessive amount of dirt build up on area of stagnation 322. Advantageously, a vacuum is applied by a source 328 to interior cavity 326 of cylinder 320 so as to remove the dirt which enters through slots 325 or is deposited on cylinder 320 adjacent slots 325.

Figure 4:
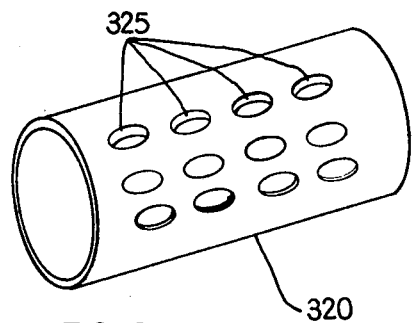
FIG. 4 is a perspective view of the embodiment of FIG. 3.

Referring to FIG. 4, a persepective view of the cylinder 20 shows slots 325 as being generally oval, and aligned in a series of rows and columns. Slots 325 are advantageous to remove dirt adjacent area of stagnation 322 but there must be sufficient material of cylinder 320 to cause deflection of the air stream approaching cylinder 320.

While the invention has been described in conjunction with a cylinder 20, it is not necessary that the object diverting the air flow be circular in cross section. Advantageously, the body has a shape so that when it is placed adjacent the wire the air flow past the wire is substantially dirt free. That is, there must be sufficient deflection of the air flow to cause separation of the dirt from the air flowing past the wire without creating an unnecessarily great amount of turbulence. Such turbulence tends to cause erroneous indication of the amount of air flowing past the wire.

Dirt deposition takes place at the stagnation area because the dirt particles have a greater density than air. Further, they are dragged by the air stream and have a velocity slightly less than the air. They cannot turn as easily as the air because of their greater inertia. Air approaching cylinder 20 directly along center line 24 carrying a particle of dirt will hit the cylinder and the dirt will be deposited there. Dirt in an adjacent air flow streamline slightly off center will also be deposited on cylinder 20 because the inertia of the dirt is greater than that of air and cannot turn as readily. Beyond the angle defining the edges of area of stagnation 22, the air will be clean and there will be no dirt deposition on cylinder 20. This invention makes use of this phenomena by placing a small diameter element adjacent to the clean region of the large diameter cylinder. The area of stagnation is less than 90° on either side of center line 24 and typically extends about 40° on either side of center line 24.

Various modifications and variations will no doubt occur to those skilled in the art. For example, the particular shape of the bluff body may be varied from that disclosed herein. These and all other variations which basically rely on the teachings through which this disclosure has advanced the art are properly considered within the scope of this invention.

INDUSTRIAL APPLICABILITY

A heated element mass air flow meter in accordance with an embodiment of this invention can be used to measure air intake to an internal combustion engine. Such a measurement can be advantageously used in determining and governing the air/fuel ratio supplied to the engine. Proper control of air/fuel ratio can result in improved fuel economy and reduction of undesirable emissions from the internal combustion engine.

I claim:

1. A heated element mass air flow meter for measuring mass air flow including:
    an elongated element means positioned in the air flow having a temperature responsive resistance for conducting an electric current, an electrical parameter of said element means being indicative of the mass of air flowing past said element means;
    an elongated bluff body means positioned generally parallel to and spaced from said element means, said bluff body means providing sufficient resistance to air flow so as to create an area of stagnation upstream of said bluff body means for separating air born dirt from the air stream said bluff body means having a relatively large cylindrical cross section area in comparison to the cross section area of said elongated element means;
    said element means being positioned downstream of said area of stagnation so as to be in a relatively dirt free area in comparison to the remainder of the stream and said element means being positioned adjacent said bluff body means at a distance substantially less than the longest cross section dimension of said bluff body means; and
    said element means being positioned downstream of an angular segment on the upstream side of said bluff body means and centered about the centerline of said bluff body means, the angular segment extending about 40 degrees to each side of said centerline.

2. A heated element air flow meter as recited in claim 1 wherein said bluff body means includes an interior cavity and the surface of said bluff body means within said area of stagnation includes slots connecting said interior cavity to the outside of said bluff body means so as to remove dirt deposited on the area of stagnation.

3. A heated element air flow meter as recited in claim 2 further including pressure reducing means coupled to said interior cavity to aid in removing dirt entering said area of stagnation.

* * * * *